(12) United States Patent
Chou

(10) Patent No.: US 6,229,773 B1
(45) Date of Patent: May 8, 2001

(54) CENTRAL SERVO CONTROLLER IN AN OPTICAL DISC DRIVE

(75) Inventor: Wen-Te Chou, Yilan Hsien (TW)

(73) Assignee: Mediatak Inc., Hsinchu (TW)

( * ) Notice: Subject to any disclaimer, the term of this patent is extended or adjusted under 35 U.S.C. 154(b) by 0 days.

(21) Appl. No.: 09/265,769

(22) Filed: Mar. 10, 1999

(30) Foreign Application Priority Data

Feb. 8, 1999 (TW) .................................................. 88101871

(51) Int. Cl.$^7$ ....................................................... G11B 7/09
(52) U.S. Cl. ................................ 369/44.28; 369/124.01; 369/44.29
(58) Field of Search .............................. 369/44.11, 44.23, 369/44.14, 44.25, 44.27, 44.28, 44.29, 44.34, 44.35, 47, 54, 58, 59, 124.01

(56) References Cited

U.S. PATENT DOCUMENTS 6,055,218 * 4/2000 Takeda et al. ..................... 369/44.28
6,154,424 * 11/2000 Koa et al. ........................... 369/44.28

\* cited by examiner

Primary Examiner—Muhammad Edun

(57) ABSTRACT

A central servo control system is used in an optical disc drive to control an optical pickup head. The optical at least includes a lens. The central servo control system includes a radio frequency (RF) amplifier, a sled motor, a tracking coil, and a central servo controller. The RF amplifier chip is coupled to the optical pickup head so as to receive the optical signal, which is amplified and processed so as to produce a RF data signal, a tracking error (Te) signal, and a central servo (Tcs) signal. The sled motor is used to hold the optical pickup head and move the optical pickup head to a desired position. The tracking coil located on the optical pickup head is used to move the lens to a designed position so as to allow the optical signal to be easily detected by the optical pickup head. The central servo controller receives the RF data signal, the Te signal, and the Tcs signal from the RF amplifier chip, and accordingly exports a tracking control signal to the tracking coil. If the system is operated at a following mode, the central servo controller exports the tracking control signal to control the tracking coil according to the Te signal. If the system is operated at a seeking mode, the central servo controller exports the tracking control signal to control the tracking coil according to the Tcs signal.

16 Claims, 12 Drawing Sheets

CENTRAL SERVO CONTROLLER IN AN OPTICAL DISC DRIVE

CROSS-REFERENCE TO RELATED APPLICATION

This application claims the priority benefit of Taiwan application serial no. 88101871, filed Feb. 8, 1999, the full disclosure of which is incorporated herein by reference.

BACKGROUND OF THE INVENTION

1. Field of the Invention

This invention relates to an optical pickup head in an optical disc drive, and more particularly to a central servo controller (CSC) used to reduce fluctuation of the optical pickup head in the optical disc drive through a digital signal processing technology.

2. Description of Related Art

A basic structure for an optical disc drive is shown in FIG. 1. In FIG. 1, an optical disc drive 100 includes an optical pickup head (PUH), a rotating disc 110, which is rotated by a spindle motor 120 or a disc motor. The PUH is held by a sled motor 130 and a tracking coil 140. A radio-frequency (RF) amplifier 150, a motor driver 160, and a digital signal processing (DSP) chip 170 are further used to control the sled motor 130 and the tracking coil 140. The DSP chip 170 includes a central servo controller (CSC) 172.

Generally, a seeking action is first needed to read data stored on the disc 110. The seeking action includes locating the optical pickup head PUH to a desired track. The optical pickup head PUH is driven by the sled motor 130 and the tracking coil 140. Then, the rotating motor 120 rotates the disc 110. The optical pickup head PUH read data stored on the disc 110 through optical technology. The read data and related information responded by the optical pickup head PUH are converted into electrical signals and amplified by the RF amplifier 150. Output information of the RF amplifier 150 at least includes RF data signals, a tracking error signal (Te), and a central servo signal (Tcs), all of which are sent to the DSP chip 170. The central servo controller CSC 172 produces a control signal FMO and a control signal TRO according to the sending-in signals. The control signal FMO is used to control the sled motor 130 and the control signal TRO is used to control the tracking coil 140 so as to locate a desired track position. The motor driver 160 receives the control signals FMO and TRO and properly drive the sled motor 130 and the tracking coil 140 to locate the optical pickup head PUH onto the desired track position.

The optical pickup head PulH includes a laser beam, which is incident onto the disc 110 and is reflected by the disc 110 into three reflected beams. FIG. 2 is a drawing, schematically illustrating reflected beams from the disc as the laser beam is incident onto the disc. In FIG. 2, the laser beam is vertically incident onto the disc 110, which has stored disc data. Due to diffraction effect, the laser beam is reflected to from a reflection pattern which includes three maximums: −1 order maximum, 0 order maximum, and +1 order maximum with respect to a −1st order reflected beam, 0th order reflected beam, and +1st order reflected beam. The reflected beams are usually detected by photodetectors as shown in FIG. 3, which is a drawing projected on a disc plane X-Y, schematically illustration a photodetector arrangement to detect reflected beams. In FIG. 3, there are three photodetectors 310, 320, and 330, which are respectively located on regions 310', 320' and 330'. Each of the photodetectors 310, 320, and 320 has a separating distance of ½ track pitch along the X-direction as denoted in FIG. 3. The photodetector 320 is located at the middle and further includes four detecting regions A, B, C, and D, the photodetector 310 includes a detection region F, and the photodetector 330 includes a detecting region E, in which each of the detecting regions includes a photosensor.

In FIG. 2 and FIG. 3, the sensors A and B of the photodetector 320 are used to detect the reflected beam in the +X-direction and the sensors C and D of the photodetector 320 are used to detect the reflected beam in the -X-direction. The central servo signal Tcs is defined as a computed quantity of (A+B)−(C+D). The central servo signal Tcs is used by the central servo controller 172 of FIG. 1 to drive the optical pickup head PUH as to be described later in detail.

FIG. 4A is a drawing projected on a disc plane, schematically illustrating a relative location of the middle photodetector on a track with two adjacent tracks. In FIG. 4A, a track on a track position X0 on the optical disc. An adjacent track on a track position X4 is beside the track position X0 at the outer side, and an adjacent track at a track position X4' is beside the track position X0 at the inner side. The inner direction points to a center point of the optical disc. The track pitch between the track position X0 and the track position X4 is divided in four equal regions as sequentially denoted by position X1, X2, and X3. Similarly, positions X1', X2', and X3' divide the track pitch between position X0 and the position X4' into four equal regions. They are substantially symmetrical.

FIG. 4 is a light intensity distribution, schematically illustrating intensity of reflected beams on the middle photodetector of FIG. 4A at different location. In FIG. 4A, when reflected beams are detected by the photodetector 320 through the four sensors A, B, C, and D. A detected light intensity distribution of the photodetector 320 is different as the location of the photodetector 320 is different. In FIG. 4B, each ellipse respectively corresponds to one of the positions X4'–X4. White region represents high intensity, light gray region represents middle intensity, and the dark gray region represents low intensity. In each ellipse, a central circle area is mainly contributed by the $0^{th}$ order reflected beam, and two side half-circle areas at both side are respectively contributed by the $-1^{st}$ and $+1^{st}$ order reflected beams, which are respectively detected by the sensors C, D and the sensors A, B.

The central servo signal Tcs is obtained by the result of (A+B)−(C+D). As the photodetector 320 is at the position X0, the Tcs is zero due to symmetrical property. As the photodetector 320 shifts to the position X1 (X1') or the position X3 (X3'), the Tcs is strong due to imbalance from the $+1^{st}$ order and the $-1^{st}$ order reflected beams. The Tcs is also zero at the position X2 (X2'), which is at half of the track pitch. The Tcs distribution with sign along the track radial direction is shown in FIG. 4C, in which the sign also distinguishes the contribution from the sensors A, B or the sensors C, D. The distribution of the Tcs is like a sine periodic function. Each time of track crossing action induces one period of the sine function. The frequency of the Tcs can be converted into a track crossing velocity of the optical pickup head PUH of FIG. 1. The optical pickup head PUH is driven by the tracking coil 140.

For the typical optical disk drive shown in FIG. 1, as the sled motor 130 seeks a desire track, it typically includes an acceleration velocity and a deceleration velocity, which usually induce a position fluctuation on the tracking coil 140. If the position fluctuation severely occurs, the tracking coil 140 may result in a focus failure. Moreover, as the operation status enters a following track mode, the position fluctuation is also harmful to the read data from the optical disc 100.

FIG. 5A and FIG. 5B are drawings, schematically illustrating a relative location between a lens of the optical pickup head and the middle photodetector, when the lens is on the desired position or deviates from the desired position. In FIG. 5A, a lens 510 is located at a center of the sensors A–D without deviation. In FIG. 5B, the lens 520 deviates a little from an original area 510'. As the situation in FIG. 5B, a larger portion of the lens 520 is detected by the sensors A and B. In this manner, the intensity quantity of A+B is larger than the intensity of C+D. The Tcs obtains a positive quantity. Otherwise, the TCs is zero in FIG. 5A. The lens 520 can be controlled to stay on the central position of the photodetector 320 through the feedback signal of the Tcs. The position fluctuation issue can therefore be solved. The lens control usually is done by an external band pass filter (BPF) circuit. For the conventional manner, the Tcs is only used to locate the optical pickup head onto the desired position.

However, for various different types of optical disc drives, suitable frequency range and signal gain of the BPF circuit are necessary to be properly adjusted, resulting in inconvenient operation. Moreover, the BPF needs operational amplifiers, switching chip set, capacitors, resistors, and so on. Fabrication cost is increased.

SUMMARY OF THE INVENTION

It is at least an objective of the present invention to provide a central servo control system with various options so as to easily optimize a control ability in various types of optical disk drive. The fluctuation of the optical pickup head can also be effectively reduced.

In accordance with the foregoing and other objectives of the present invention, a central servo control system, which is used in an optical disc drive to control an optical pickup head so as to read data stored on an optical disc, is provided. The optical pickup head at least includes a lens, and is used to read an optical signal from the optical disc. The central servo control system includes a radio frequency (RF) amplifier, a sled motor, a tracking coil, and a central servo controller. The RF amplifier is coupled to the optical pickup head so as to receive the optical signal, which is amplified and processed so as to produce a RF data signal, a tracking error (Te) signal, and a central servo (Tcs) signal. The sled motor is used to hold the optical pickup head and move the optical pickup head to a desired position, such as a desired track. The tracking coil located on the optical pickup head is used to move the lens to a designed position so as to allow the optical signal to be easily detected by the optical pickup head. The central servo controller receives the RF data signal, the Te signal, and the Tcs signal from the RF amplifier, and accordingly exports a tracking control signal to the tracking coil. If the system is operated at a following mode, the central servo controller exports the tracking control signal to control the tracking coil according to the Te signal. If the system is operated at a seeking mode, the central servo controller exports the tracking control signal to control the tracking coil according to the Tcs signal.

In accordance with the foregoing and other objectives of the present invention, another central servo control system is provided to control an optical pickup head so as to read data stored on an optical disc. The optical pickup head at least includes a lens, and is used to read an optical signal from the optical disc. The central servo control system includes a sled motor, a tracking coil, and a central servo controller. The sled motor is used to hold the optical pickup head and move the optical pickup head to a desired position, such as a desired track. The tracking coil located on the optical pickup head is used to move the lens to a designed position so as to allow the data stored on the optical disc to be easily read. The central servo controller receives a tracking error (Te) signal and a central servo (Tcs) signal, and accordingly exports a tracking control signal to the tracking coil. If the system is operated at a following mode, the central servo controller exports the tracking control signal to control the tracking coil according to the Te signal. If the system is operated at a seeking mode, the central servo controller exports the tracking control signal to control the tracking coil according to the Tcs signal.

In accordance with the foregoing and other objectives of the present invention, still another central servo control system is provided to control an optical pickup head so as to read data stored on an optical disc. The optical pickup head at least includes a lens, and is used to read an optical signal from the optical disc. The central servo control system includes a RF amplifier, a sled motor, a tracking coil, and a central servo controller. The RF amplifier coupled to the optical pickup head is used to receive and process the optical signal from the optical pickup head, and export a RF data signal and a selected one of a tracking error (Te) signal or a central servo (Tcs) signal. The sled motor is used to hold the optical pickup head and move the optical pickup head to a desired position, such as a desired track. The tracking coil located on the optical pickup head is used to move the lens to a designed position so as to allow the optical signal to be easily detected by the optical pickup head. The central servo controller receives the RF data signal and the selected one of the Te signal or the Tcs signal, and accordingly exports a tracking control signal to the tracking coil. If the system is operated at a following mode, the central servo controller receives the selected Te signal and exports the tracking control signal to control the tracking coil. If the system is operated at a seeking mode, the central servo controller receives the selected Tcs signal and exports the tracking control signal to control the tracking coil.

In accordance with the foregoing and other objectives of the present invention, still yet a central servo control system is provided to control an optical pickup head so as to read data stored on an optical disc. The optical pickup head at least includes a lens, and is used to read an optical signal from the optical disc. The central servo control system includes a sled motor, a tracking coil, and a central servo controller. The sled motor is used to hold the optical pickup head and move the optical pickup head to a desired position, such as a desired track. The tracking coil located on the optical pickup head is used to move the lens to a designed position so as to allow the data stored on the optical disc to be easily read. The central servo controller exports a sled motor control signal (FMO) and a tracking control signal (TRO) so as to respectively control the sled motor and the tracking coil. If the system is operated at a seeking mode, the TRO is compensated by an internal compensator of the central servo controller according to the FMO, and then is exported to control the tracking coil.

In accordance with the foregoing and other objectives of the present invention, still yet another central servo control system is provided to control an optical pickup head so as to read data stored on an optical disc. The optical pickup head at least includes a lens, and is used to read an optical signal from the optical disc. The central servo control system includes a sled motor, a tracking coil, a velocity estimator, and a central servo controller. The sled motor is used to hold the optical pickup head and move the optical pickup head to a desired position, such as a desired track. The tracking coil located on the optical pickup head is used to move the lens to a designed position so as to allow the data stored on the optical disc to be easily read. The velocity estimator coupled to the optical pickup head is used to estimate a moving velocity of the optical pickup head and accordingly export a velocity estimated signal Vspd to the central servo controller. The central servo controller receives the Vspd and accordingly exports a sled motor control signal (FMO) and a tracking control signal (TRO) so as to respectively control the sled motor and the tracking coil. If the system is operated at a seeking mode, the TRO is generated according to the Vspd.

In accordance with the foregoing and other objectives of the present invention, still yet another central servo control system is provided to control an optical pickup head so as to read data stored on an optical disc. The optical pickup head at least includes a lens, and is used to read an optical signal from the optical disc. The central servo control system includes a radio frequency (RF) amplifier, a sled motor, a tracking coil, a velocity estimator, and a central servo controller. The RF amplifier coupled to the optical pickup head is used to receive and process the optical signal from the optical pickup head, and export a RF data signal, a tracking error (Te) signal, and a central servo (Tcs) signal. The sled motor is used to hold the optical pickup head and move the optical pickup head to a desired position, such as a desired track. The tracking coil located on the optical pickup head is used to move the lens to a designed position so as to allow the optical signal to be easily detected by the optical pickup head. The velocity estimator, coupled to the optical pickup head, is used to estimate a moving velocity of the optical pickup head and accordingly export a velocity estimated signal Vspd to the central servo controller. The central servo controller receives the RF data signal, the Vspd, the Te signal, and the Tcs signal and exports a sled motor control signal (FMO) and a tracking control signal (TRO) so as to respectively control the sled motor and the tracking coil. If the system is operated at a seeking mode, the TRO before being exported is compensated by an internal compensator of the central servo controller according to the FMO, and the compensated TRO is combined with the Tcs signal and the Vspd. After combination, the TRO is exported by the central servo controller to control the tracking coil.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

In order to at least have more options of control signals to suit various types of optical disc drive and effectively reduce fluctuation of the optical pickup head, a preferred embodiment of the invention is introduced. In the following descriptions, a similar reference number or a similar abbreviation stands for a similar device element.

Figure 6A:
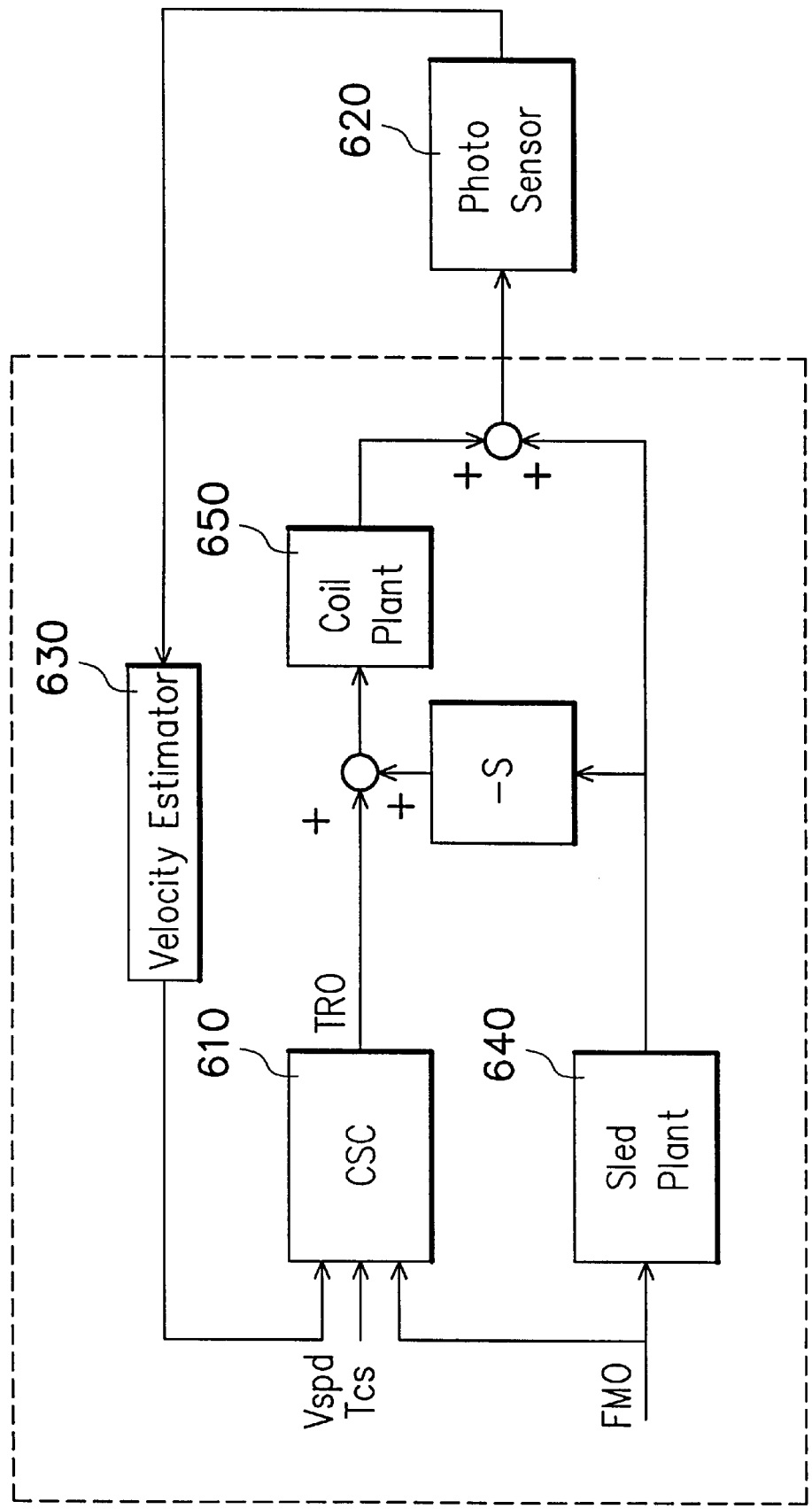
FIG. 6A is a block diagram, schematically illustrating a control scheme of a central servo control system, according to a preferred embodiment of the invention.

From a control point of view, a sled motor (Sled) and a track coil motor (Coil) located on an optical pickup head form a two-body system with low rigidity to serve as a bi-system breaker. So, when an central servo control system is operated at a following mode, the Coil will shift to an opposite direction to the moving direction of the Sled, during acceleration or deceleration period due to inertial reaction. The acceleration can, for example, be simulated by a second-derivative simulation operator (S). FIG. 6 is a block diagram, schematically illustrating a control scheme of a central servo control system, according to a preferred embodiment of the invention. In FIG. 6A, the block −S represents an acceleration or a deceleration. A Sled plant 640 exports a velocity, which is further differentiated as the acceleration. The negative sign of the −S represents a force direction induced by the inertial reaction between the Sled plant 640 and a Coil plant 650. Both the Sled plant 640 and the Coil plant 650 move a photosensor 620, which moves with a velocity. The photosensor 620 exports its output to a velocity estimator 630, which estimates the velocity and exports a velocity estimated signal Vspd to a central servo controller (CSC) 610 to determine a seeking velocity. If the CSC 610 just behaves like a conventional one without further functions, the relative motion between the Sled plant 640 and the Coil plant 650 depends on their inertial moment with low rigidity and their damping coefficient. In this manner, if the acceleration/deceleration is irregular, the Coil plant 650 will irregularly fluctuate.

Figure 1:
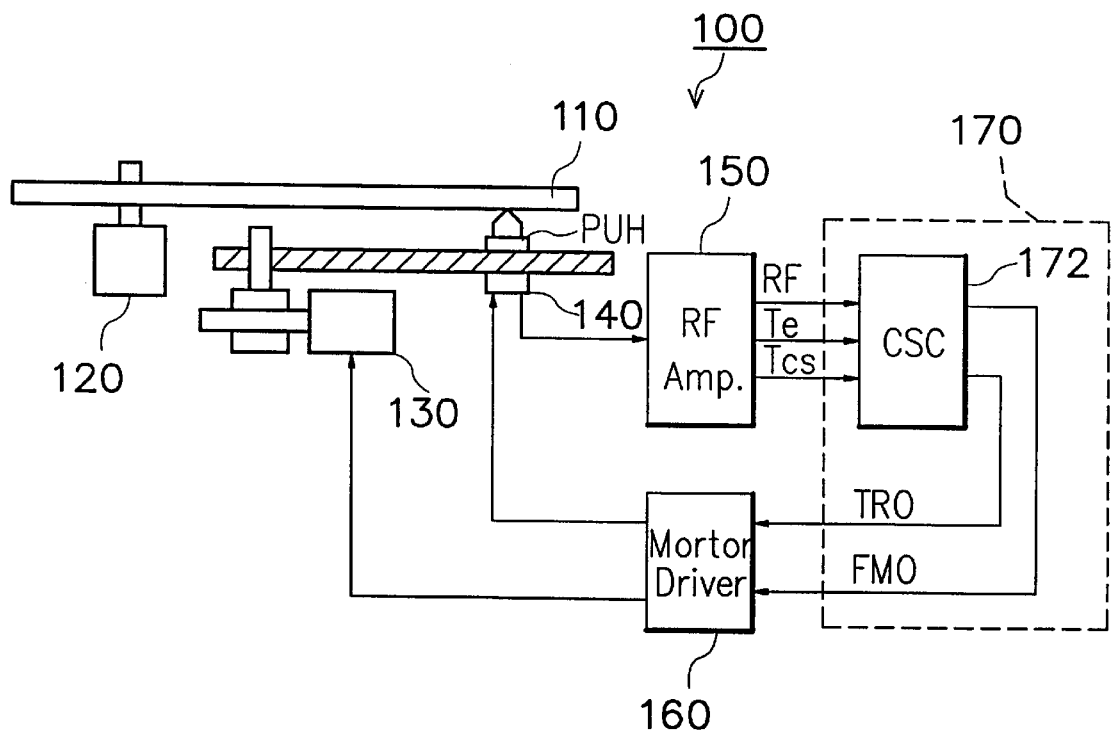
FIG. 1 is a structure drawing, schematically illustrating a structure of a typical optical disk drive.
Figure 2:
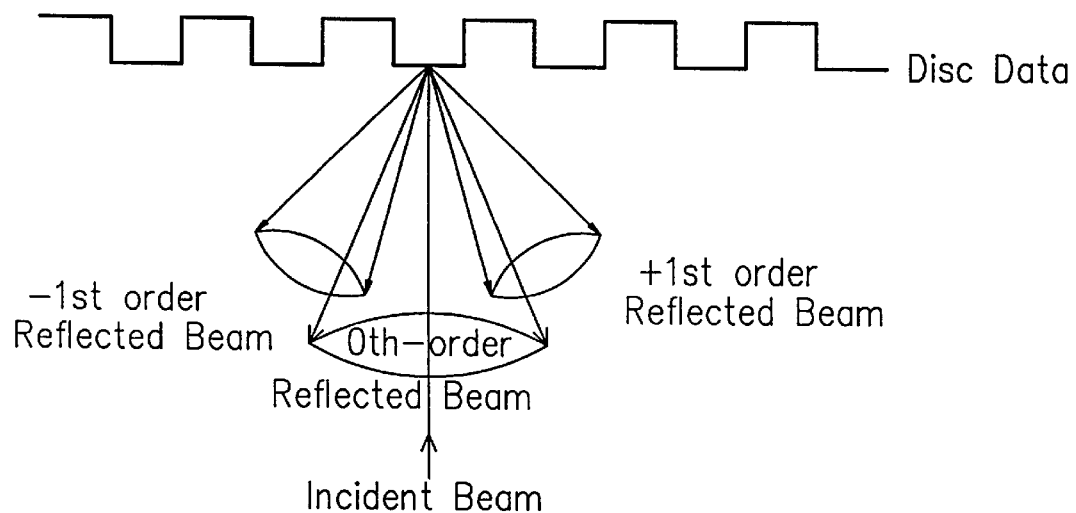
FIG. 2 is a drawing, schematically illustrating reflected beams from an optical disc as the laser beam is incident onto the disc.
Figure 3:
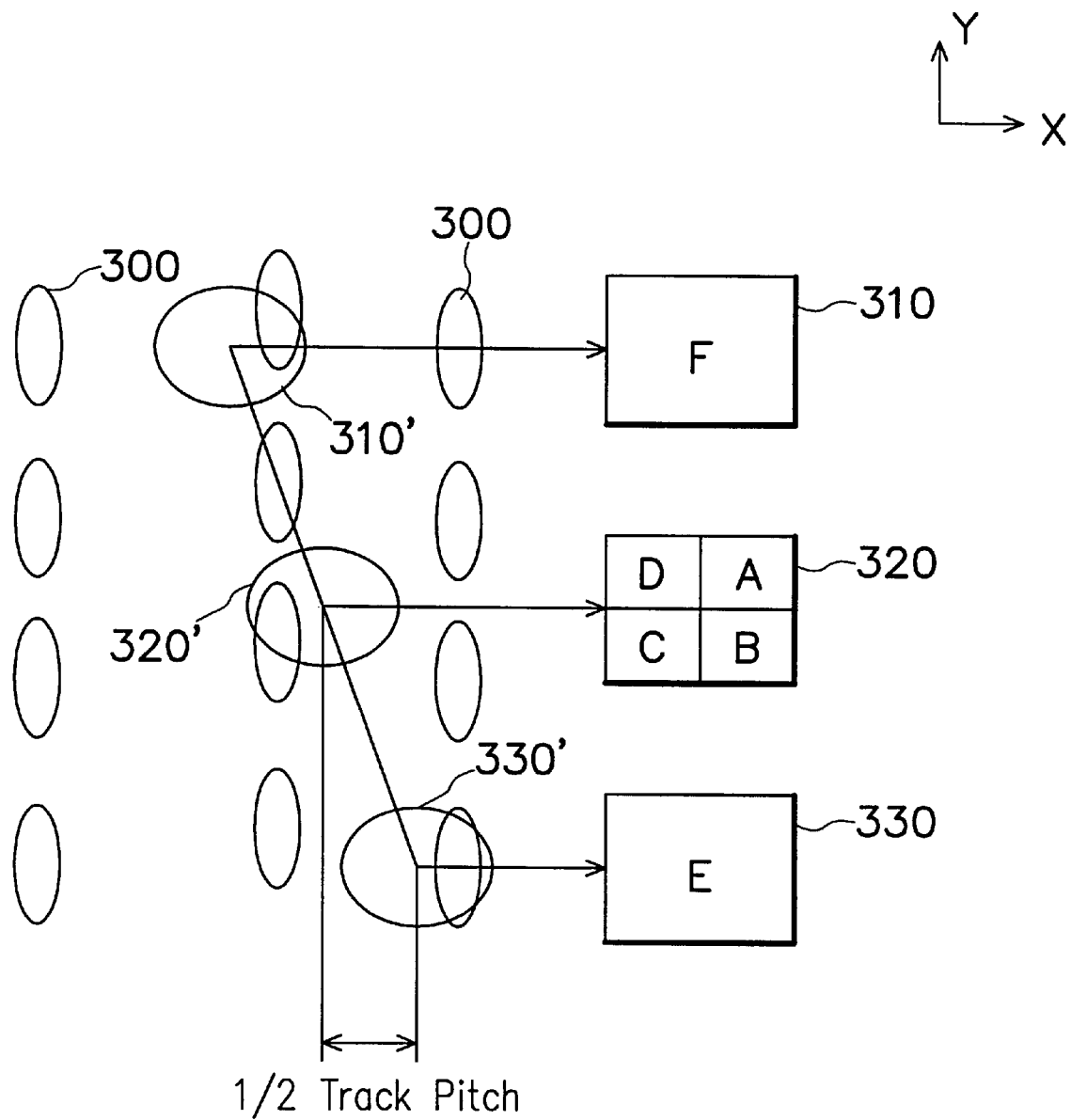
FIG. 3 is a drawing projected on a disc plane X-Y, schematically illustration a photodetector arrangement to detect reflected beams.
Figure 4A:
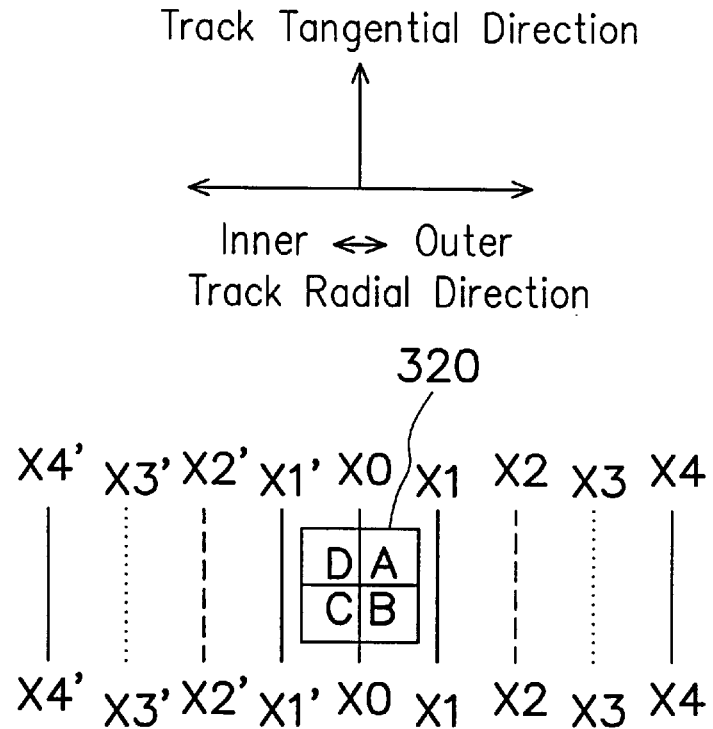
FIG. 4A is a drawing projected on a disc plane, schematically illustrating a relative location of the middle photodetector on a track with two adjacent tracks.
Figure 4B:
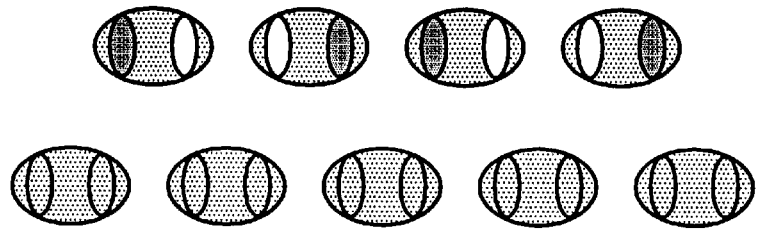
FIG. 4B is a drawing, schematically illustrating detected light intensity by the middle detector at different locations in FIG. 4A.
Figure 4C:
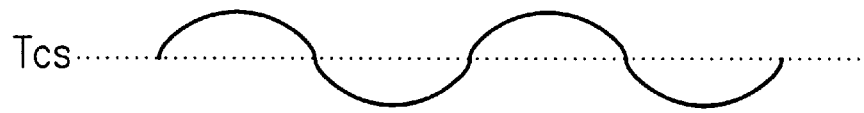
FIG. 4C is a drawing, schematically illustrating a central servo signal distribution.
Figure 5A:
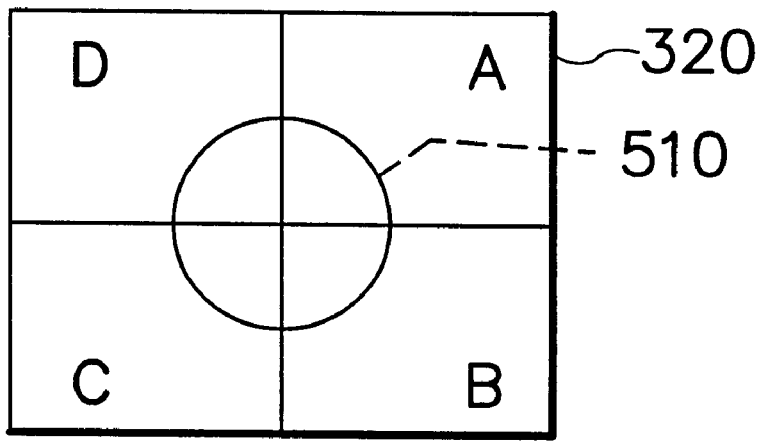
FIG. 5A and FIG. 5B are drawings, schematically illustrating a relative location between a lens of the optical pickup head and the middle photodetector, when the lens is on the desired position or deviates from the desired position.
Figure 5B:
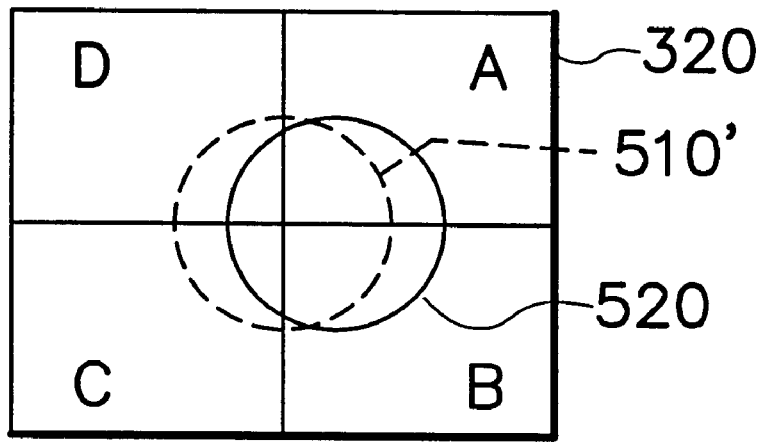

Therefore, the CSC 610 further includes some more functions so as to at least solve the fluctuation issue. The CSC 610 of the invention includes at least, for example, three input signals and at least one output signal. The input signals includes, for example, the Vspd, a central servo (Tcs) signal, a sled motor control signal (FMO), and the output signal includes, for example, a tracking control signal (TRO). The FMO is, for example, an voltage signal to exert a force to shift the Sled plant 640 for compensating the inertia reaction, in which the FMO can be timed with a factor to obtain a desired quantity. The FMO is simultaneously exported to the Sled plant 640 and the CSC 610. The Tcs signal can tell the relative motion situation between the Sled plant 640 and the Coil plant 620, and also contributes an control effect to reduce fluctuation. All of these Vspd, Tcs and FMO signals can be used to reduce the fluctuation effect. The Vspd and the Tcs signals can tell an actual current situation of the motion of the optical pickup head so that their information is very useful to reduce the fluctuation effect. The Tcs signal is, for example, a result signal resulting from the sensors A, B, C, and D as described in FIGS. 3–5B. The Vspd signal results from a digital calculation with a tracking error (Te) signal and a RF signal, which are shown in FIG. 1 and FIG. 6B.

Figure 6B:
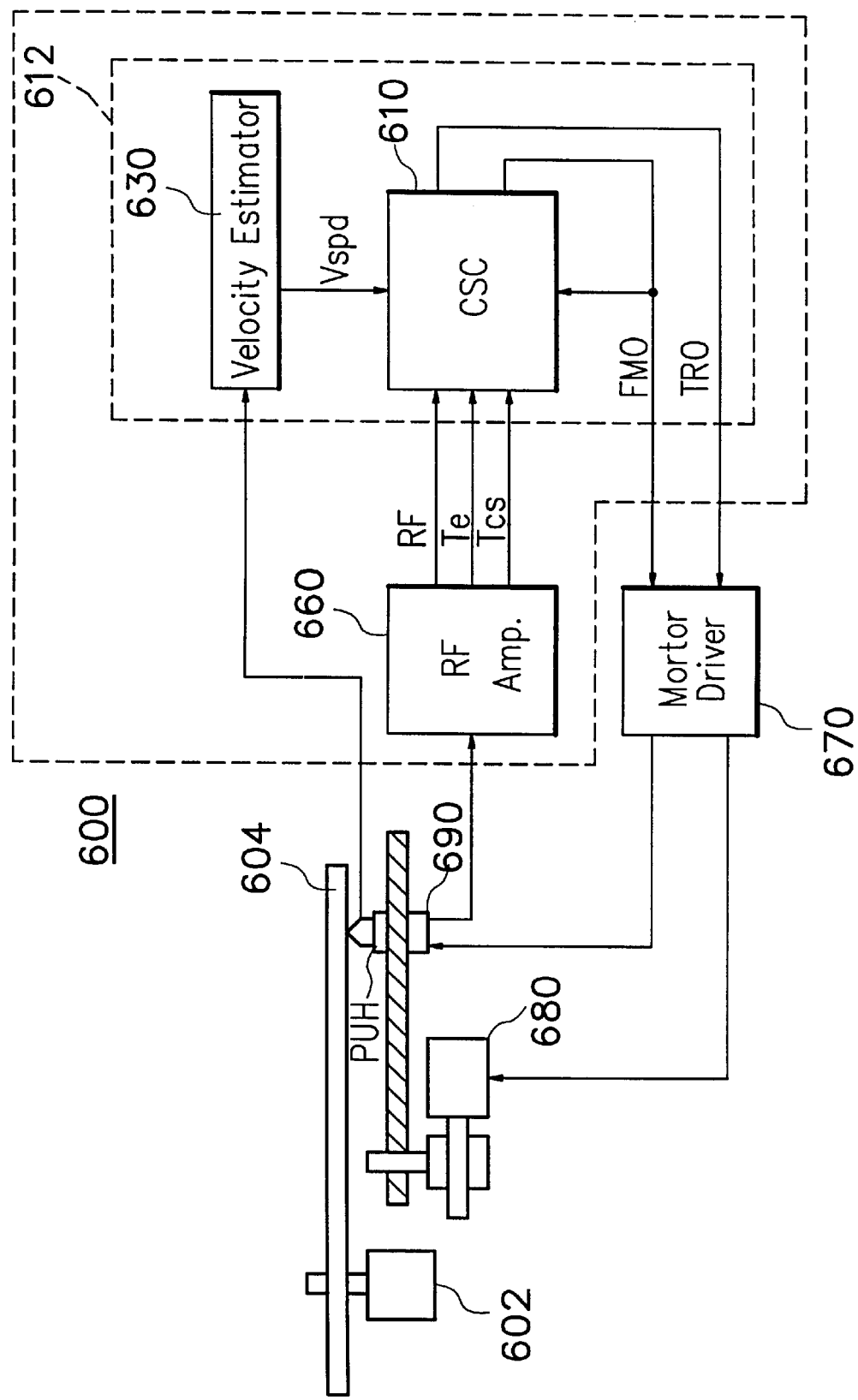
FIG. 6B is a structure drawing, schematically illustrating a structure of an optical disk drive including the central servo control system, according to the preferred embodiment of the invention.

FIG. 6B is a structure drawing, schematically illustrating a structure of an optical disk drive including the central servo control system, according to the preferred embodiment of the invention. In FIG. 6B, an optical disc drive 600, such as a CD-ROM, includes an optical pickup head PUH, a rotating disc 604, which is rotated by a spindle motor 602 or a disc motor. The PUH is held by a sled motor Sled 680 and a tracking Coil 690. A radio-frequency (RF) amplifier 660, a motor driver 670, and a digital signal processing (DSP) chip 612 are further used to control the Sled 680 and the Coil 690. The DSP chip 612 includes the CSC 610 and the velocity estimator 630 of FIG. 6A. A RF signal and a tracking error (Te) signal and the Tcs signal are exported by the RF amplifier 660 to the CSC 610. The Vspd signal and the FMO are also feedback to the CSC 610. In the actual operation, the input signals and the output signals has various options to be used so as to achieve a purpose to suit for various functional types of optical disc drive. Details are to be described later.

Figure 7A:
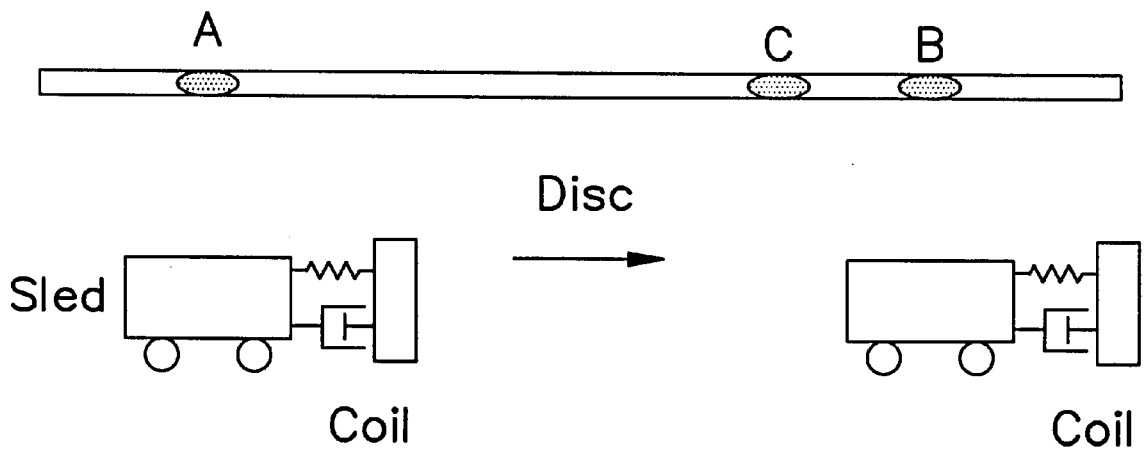
FIGS. 7A–7E are drawings, schematically illustrating motion behaviors of the optical pickup head driven by the sled motor and the tracking coil, according to the preferred embodiment of the invention.
Figure 7B:
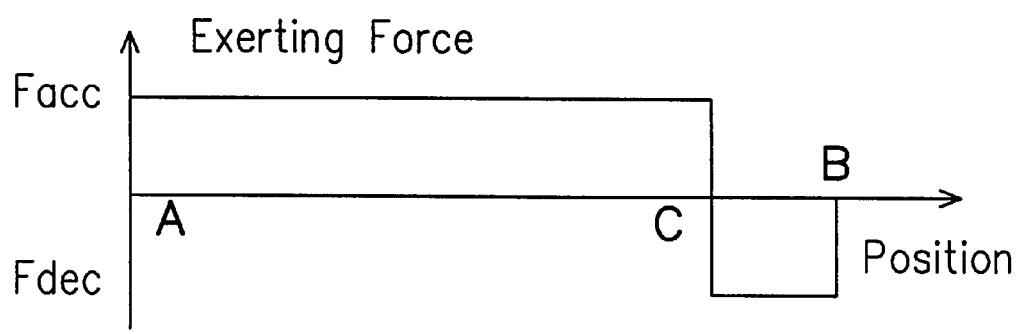
Figure 7C:
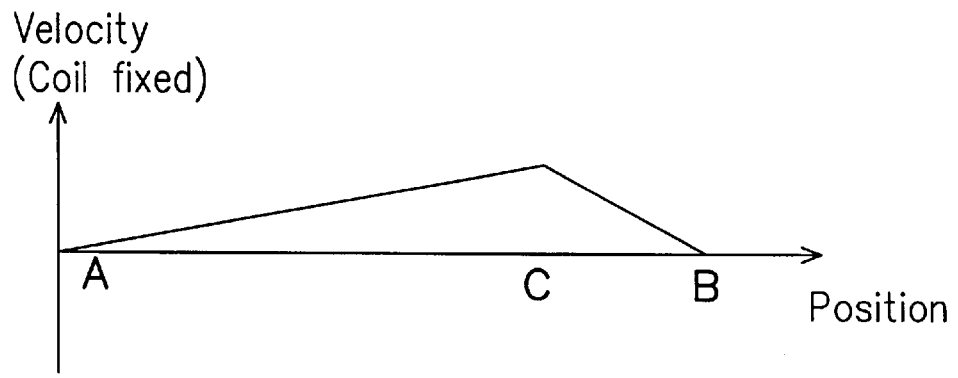
Figure 7D:
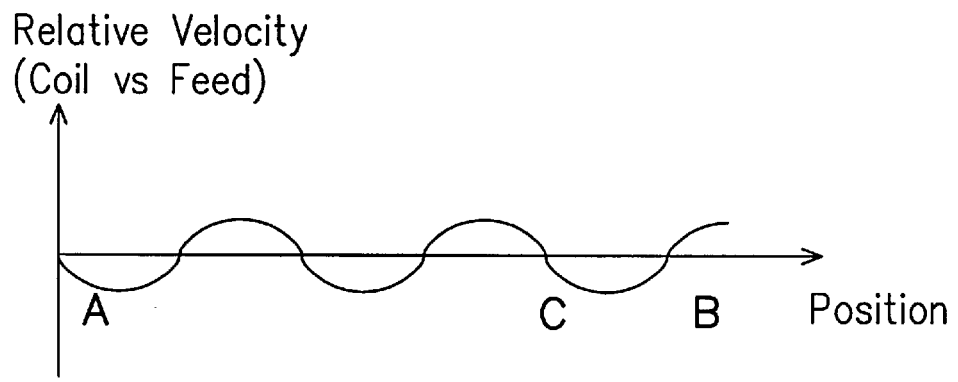
Figure 7E:
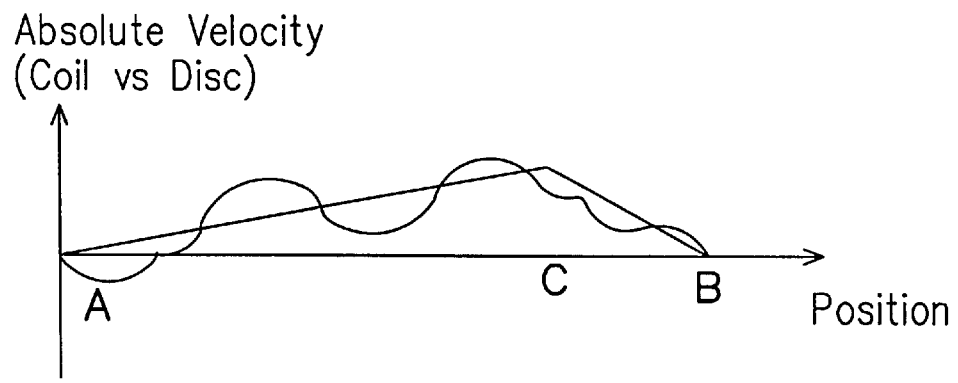

FIG. 7A–7E are drawings, schematically illustrating motion behaviors of the optical pickup head driven by the sled motor and the tracking coil, according to the preferred embodiment of the invention. In FIG. 7A, as the Sled with the Coil moves from position A to position B of the optical disc, an exerting force is applied on the Sled as shown in FIG. 7B. The Sled is accelerated between position A and position C, and is decelerated between position C and position B. The Sled is desired to stop at position B. FIG. 7C shows a Sled velocity versus position on the optical disc. Since the Coil is not a strong rigid body, it physically vibrates or fluctuates relative to the Sled as the Sled is accelerated or decelerated. A relative Coil velocity to the Sled versus position is schematically shown in FIG. 7D. An absolute velocity of the Coil resulting from a combination of the Sled velocity and the relative Coil velocity is schematically shown in FIG. 7E. In order to reduce the fluctuation effect of the Coil, the relative Coil velocity is desired to be reduced. If the relative Coil velocity can be compensated to approach zero, it means that the Coil has no fluctuation when the Sled is moving. Since the absolute velocity of the Coil include the Sled velocity and the relative Coil velocity, which are necessary to be decoupled. The Sled velocity behaves like a DC signal without frequency, and the relative Coil velocity behaves like a frequency signal so that they can be easily decoupled. A digital signal processing (DSP) circuit can be employed to filter the frequency signal out so as to obtain a net contribution of the relative Coil velocity. According to the relative Coil velocity, the relative Coil velocity is compensated or any other method. As a result, the relative Coil velocity is properly filtered out. According to the relative Coil velocity, the position of the Coils can be adjusted by, for example, an external exerting force. The relative Coil velocity can be effectively reduced. A zero relative Coil velocity means that there is no Coil fluctuation.

As mention before, a control scheme can be achieved by various combinations of the input and output signals of the CSC 610 in FIG. 6A and FIG. 6B. A different type of optical system may have different conditions or sensitive factors to the Sled and Coil.

Figure 8:
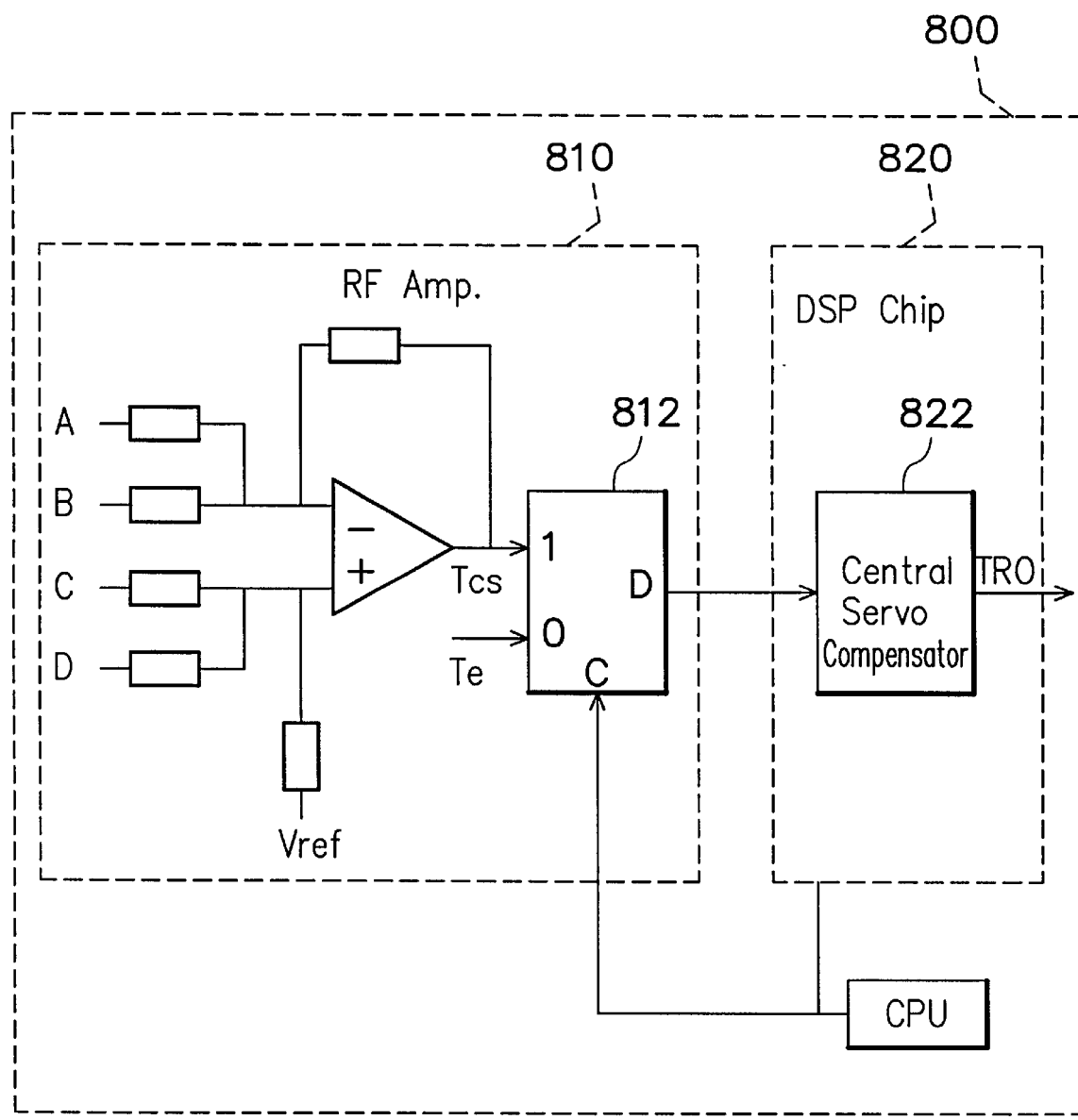
FIG. 8 is a block diagram, schematically illustrating a control system of in the central servo control system, only using a Tcs signal for compensation, according to the preferred embodiment of the invention.

A central servo control system only using the Tcs signal is, for example, introduced in FIG. 8. FIG. 8 is a block diagram, schematically illustrating a control system of in the central servo control system, only using a Tcs signal for compensation, according to the preferred embodiment of the invention. In FIG. 8, a central servo control system (CSC system) 800 includes a RF chip 810 and a DSP chip 820. The RF chip 810 includes a RF amplifier to receive sensors A, B, C, and D (FIG. 4A), and a multiplexer 812 to receive the Tcs signal and the Te signal. The multiplexed 812 exports its output signal to a servo compensator 822 in the DSP chip 820. The servo compensator 822 exports the TRO signal to control the Coil plant 650 in FIG. 6A. The multiplexer 812 selects the output signal according to a selection signal (S/_F) inputted to a C port of the multiplexer 812, in which the selection signal S/_F can be provided by, for example, the DSP chip 820 or an external central processing unit (CPU). As the CSC system 800 is operated at a seeking mode, the selection signal S/_F=1. The Tcs signal is selected and is compensated by the servo compensator 822, which produces the TRO signal to reduce the fluctuation effect of the Coil plant 650 of FIG. 6B. As the CSC system 800 is operated at a following mode, the selection signal S/_F=0. The Te signal is selected and is processed by the servo compensator 822, which produce the TRO signal to lock the sensor on the desired track number. In this manner, the Tcs signal and the Te signal are combined by the RF chip 810 and are selected by the DSP chip 820 through the C port, which performs like a switch function. The fluctuation effect of the Coil therefore can be effectively reduced.

Figure 9:
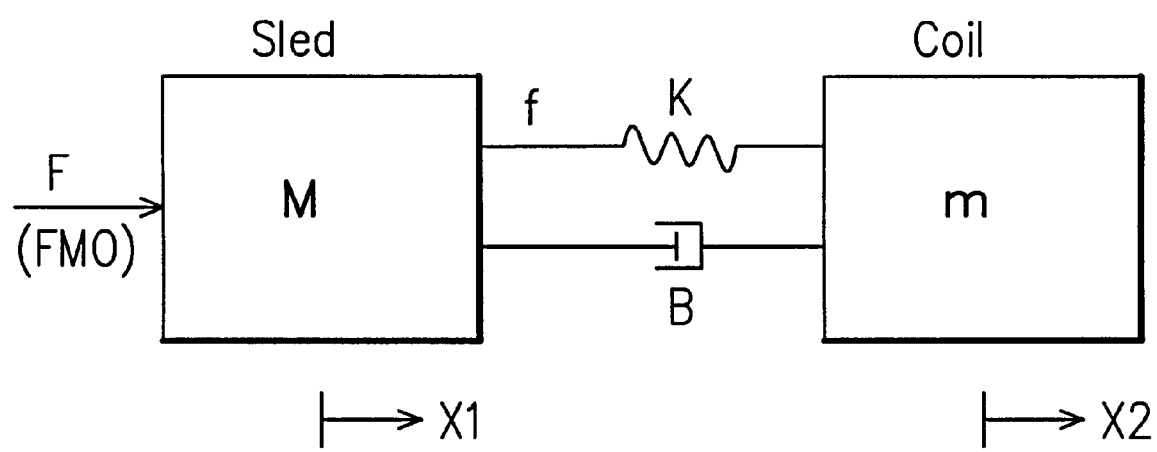
FIG. 9 is a drawing, schematically illustrating an inertia interaction between the sled motor and the tracking coil in FIG. 7A.

A theoretical derivation is following. FIG. 9 is a drawing, schematically illustrating an inertia interaction between the sled motor and the tracking coil in FIG. 7A. In FIG. 9, the Coil is mounted on Sled through, for example, a steel frame. The Sled mass is M, the Coil mass is m. The steel frame has a modulus of elasticity K and a damping coefficient B. The Sled is pushed by an exerting force F. An interaction force f exists between the Sled and the Coil through the steel frame and is function of K and B. X1 is an absolute position of the Sled on the disc, and X2 is a displacement of the Coil relative to the Sled. An optical head (not shown) held by the Coil therefore has a total displacement of X1+X2 on the disc, in which an intrinsic length of the steel frame is a constant and can be ignored in equations of motion. The mechanism of the inertia interaction is described by a set of equations of motion as follows:

$$F = M \cdot \ddot{X}1 - K(-X2) - B(-\dot{X}2), \quad (1)$$

$$m(\ddot{X}1 + \ddot{X}2) = K(-X2) + B(-\dot{X}2), \quad (2)$$

$$f = K(-X2) + B(-\dot{X}2) = m(\ddot{X}1 + \ddot{X}2). \quad (3)$$

After taking a Laplace transformation, Eq. 3 is transformed into Eq. 4:

$$f(s) = m \cdot S^2 \cdot (X1(s) + X2(s)). \quad (4)$$

Figure 10:
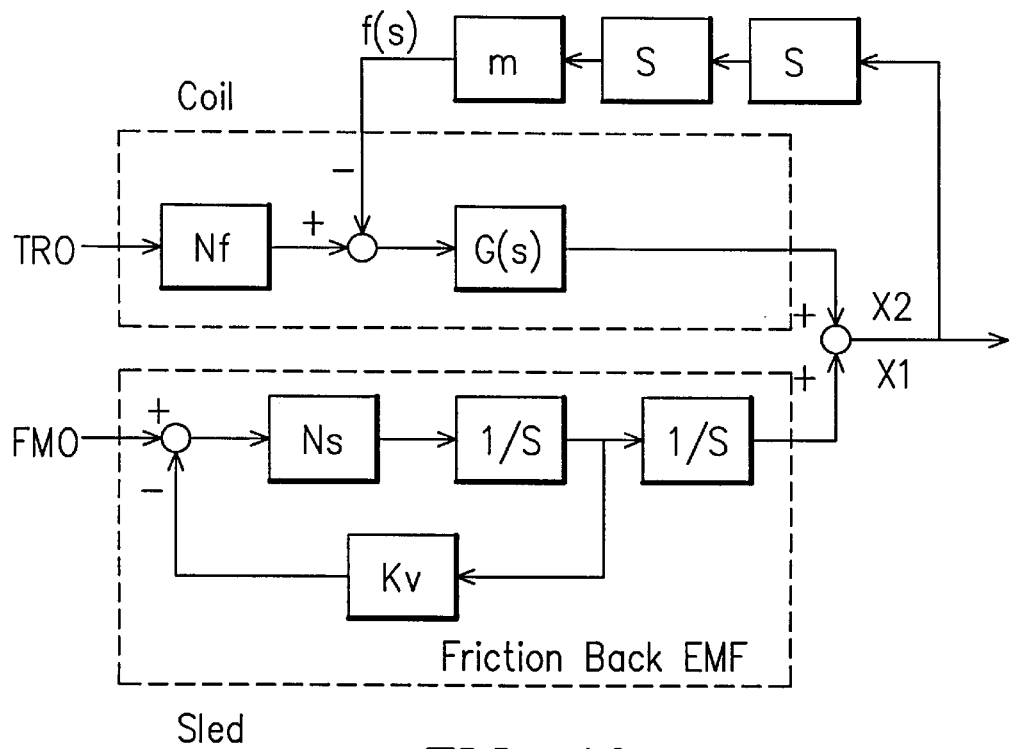
FIG. 10 is a block diagram, schematically illustrating a system structure to perform a large-distance track crossing action and a compensate route, according to the preferred embodiment of the invention.

The Eq. 4 can be applied to form a compensating route and a large-distance track crossing action as shown in FIG. 10. FIG. 10 is a block diagram, schematically illustrating a system structure to perform a large-distance track crossing action and a compensating route, according to the preferred embodiment of the invention. In FIG. 10, The FMO signal is, for example, a voltage signal that is applied to the Sled so as to produce a desired exerting force. The TRO signal is also a voltage signal, used to control the Coil. The block Nf represents a DC gain coefficient of the Coil. The block Ns represents a DC gain of the Sled. Kv is a constant of an anti-electromotive force (EMF). The Coil mass is m.

Figure 11:
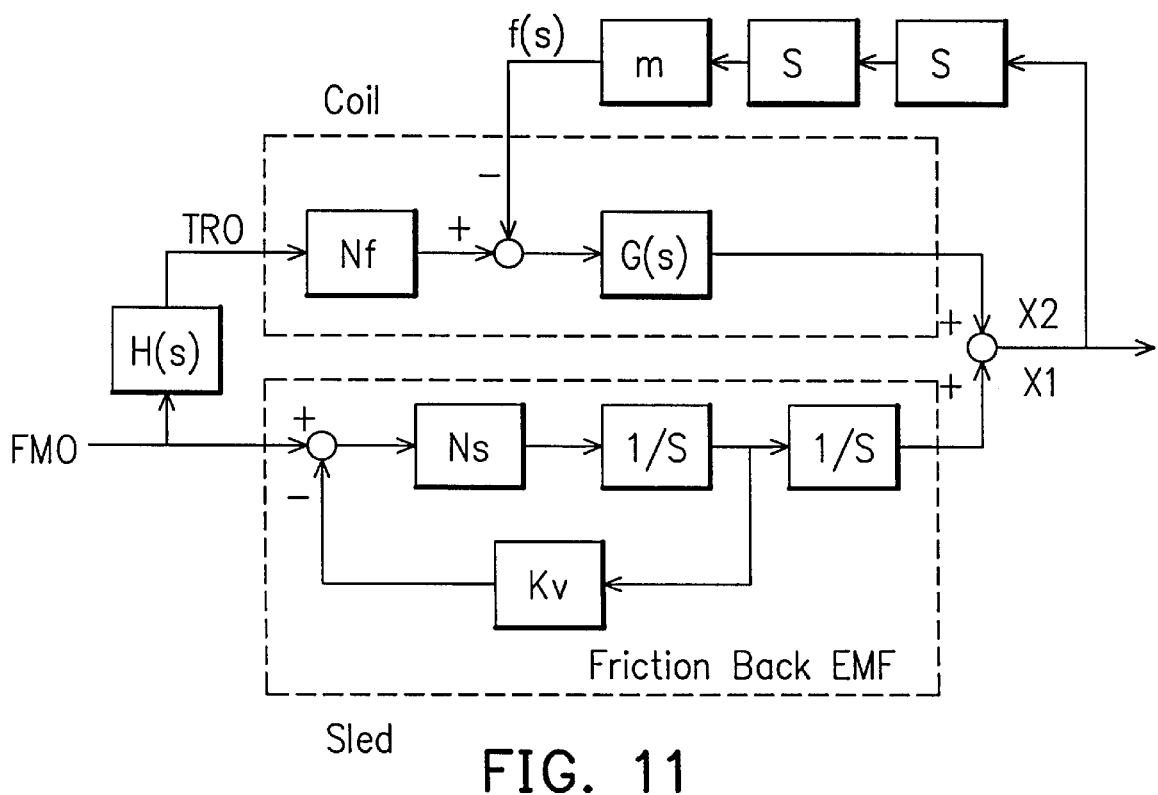
FIG. 11 is a block diagram, schematically illustrating a system structure to perform a track crossing action, using a single FMQ signal to produce the TRO signal, according to the preferred embodiment of the invention.

In another manner, the FMO signal is used to produce the TRO signal as shown in FIG. 11. FIG. 11 is a block diagram, schematically illustrating a system structure to perform a track crossing action, using a single FMO signal to produce the TRO signal, according to the preferred embodiment of the invention. In FIG. 1, the TRO signal is produced by the FMO signal through a functional block, H(s), which is used to obtain a fraction of the FMO signal. As the CSC system is operated at a seeking-mode, X2 is desired to be zero so as to avoid the Coil fluctuation. The TRO signal is obtained according to a dynamic fractional formula as derived in the following:

Referring to FIG. 11 and the Eqs. 1–4, the X2 is solved to have $$X2 = \frac{Ns \cdot (-m) \cdot G(s)}{\Delta} \cdot FMO + \frac{Nf \cdot G(s) \cdot \left(1 + Ns \cdot \frac{1}{S} \cdot Kv\right)}{\Delta} \cdot TRO,$$

$$\Delta = 1 + Kv \cdot Ns \cdot 1/S + G(s) \cdot m \cdot S^2 + Kv \cdot Ns \cdot 1/S \cdot G(s) \cdot m \cdot S^2.$$

When X2 is set to zero as desired, the TRO quantity is obtained in Eq. 5:

$$TRO = \frac{Ns \cdot m}{Nf \cdot \left(1 + Ns \cdot \frac{1}{s} \cdot Kv\right)} \cdot FMO = \frac{Ns \cdot m \cdot S}{Nf(S + Ns \cdot Kv)} \cdot FMO. \quad (5)$$

Therefore, the X2 can be compensated by TRO to be zero. As X2=0, there is no fluctuation of the Coil.

Figure 12:
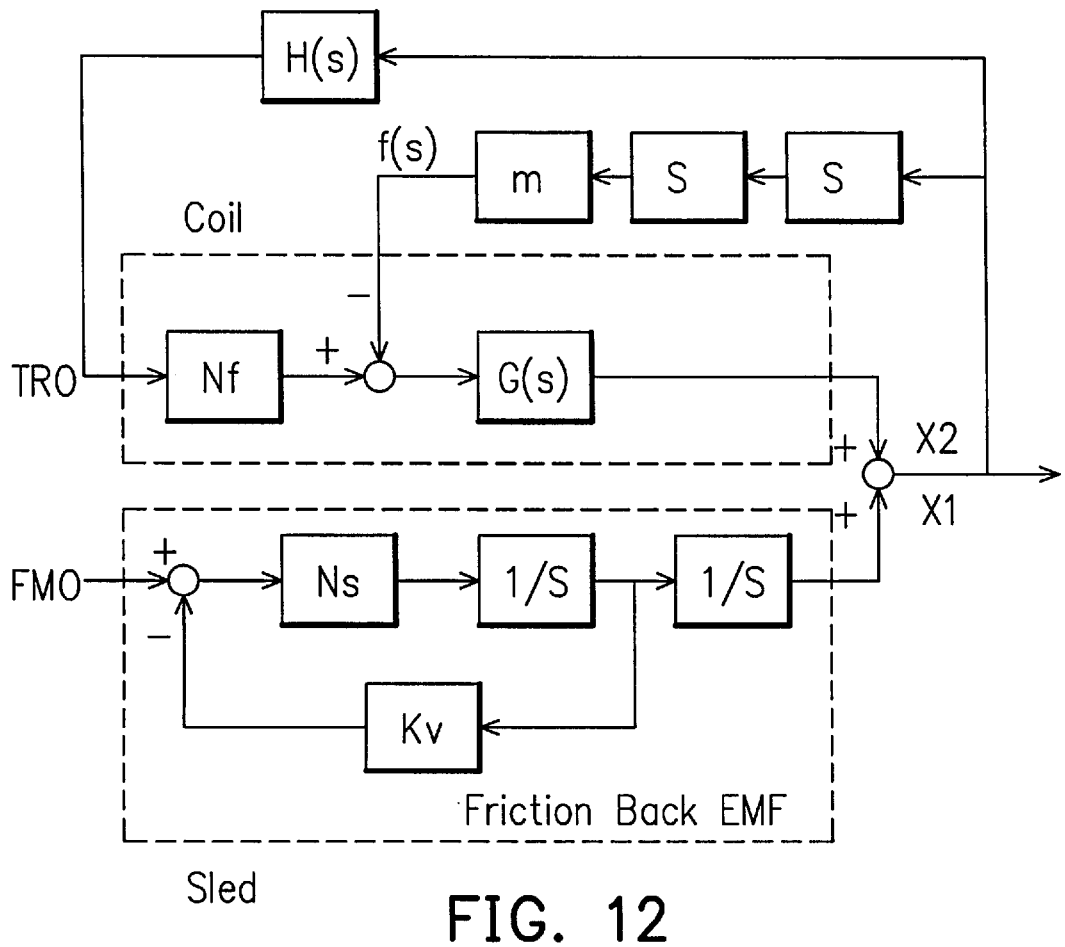
FIG. 12 is a block diagram, schematically illustrating a control system of in the central servo controller, only using a position feedback, according to the preferred embodiment of the invention.

If one desires to only use (X1+X2) quantity as a feedback signal for the CSC 610 in FIG. 6B, the control scheme is shown in FIG. 12. In FIG. 12, the functional block H(s) should be designed to have X2=0. For example, if the position of (X1+X2) or a velocity of d(X1+X2)/dt are used as a feedback control signal as shown in FIG. 12, then $$X2 = \frac{Ns \cdot \frac{1}{2} \cdot \frac{1}{2}(Nf \cdot H(S) - mS^2)G(S)}{\Delta} \cdot FMO, \quad (6)$$

$$\Delta = 1 + Ns \cdot 1/S \cdot Kv - (Nf \cdot H(S) - m \cdot S^2) \cdot G(S) + Ns \cdot 1/S \cdot (-Kv) \cdot (Nf \cdot H(S) - m \cdot S^2) \cdot G(S)$$

$$= [1 + Ns \cdot 1/S \cdot Kv][1 - (Nf \cdot H(S) - m \cdot S^2) \cdot G(S)].$$

If one desires to have X2=0 in Eq. 6, one obtains $$H(S) = \frac{m \cdot S^2}{Nf}, \quad (7)$$

which is used to design a position feedback control signal so as to reduce the fluctuation of the Coil. The position feedback manner can be easily modified into a velocity feedback manner by replacing H(S) as $$H(S) = \frac{m \cdot S}{Nf}. \quad (8)$$

Figure 13:
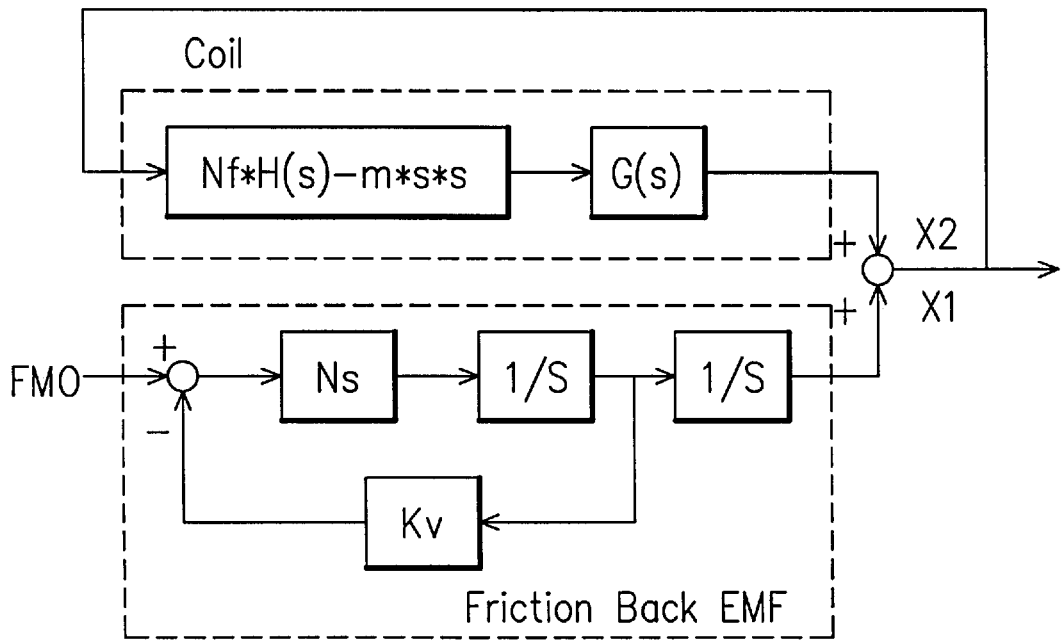
FIG. 13 is a block diagram, schematically illustrating a control system of in the central servo controller, only using a position feedback with a simplified structure of FIG. 12.

The control scheme of FIG. 12 is further simplified as a control scheme in FIG. 13.

If one desires to use the Tcs signal, resulting from ((A+B)−(C+D)), as the feedback control signal, a crossing track frequency equal to dX/dL, in which dX is the total displacement of the Coil and dL is the track pitch, is necessary to be considered. A condition should satisfy Eq. 9:

$$(1/dL \cdot Nf \cdot H(S) - m \cdot S^2) = 0, \quad (9)$$

so as to effectively reduce the fluctuation of the Coil. In the manner, the H(S) is designed as:

$$H(S) = \frac{m \cdot S^2 \cdot dL}{Nf}. \quad (10)$$

Eq. 10 is a design using a Tcs feedback control signal.

In the above descriptions, the central servo controller of the invention uses the DSP technology to control the optical pickup head during the seeking mode. The fluctuation of the optical pickup head is effectively reduced. The central servo controller at least includes three feedback control signals of Vspd, Tcs, and FMO and one output signal TRO to control the Coil and the Sled, according to a current operation mode. The FMO signal is used to control the Sled. The Vspd signal is used to estimate the moving velocity of the Coil. The Tcs signal is used to provide information of the relative motion between the Sled and the Coil. The signals of FMO, Tcs, and Vspd can be combined used in various options so as to suite for various types of optical disc drives.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A central servo control system, which is used in an optical disc drive to control an optical pickup head so as to read data stored on an optical disc, wherein the optical pickup head at least includes a lens and is used to read an optical signal from the optical disc, the control system comprising:

a radio frequency (RF) amplifier chip, coupled to the optical pickup head so as to receive the optical signal, which is amplified and processed to produce a RF data signal, a tracking error (Te) signal, and a central servo (Tcs) signal;

a sled motor, used to hold the optical pickup head and move the optical pickup head to a desired position;

a tracking coil located on the optical pickup head, wherein the tracking coil is used to move the lens to a designed position so as to allow the optical signal to be easily detected by the optical pickup head; and a central servo controller, used to receive the RF data signal, the Te signal, and the Tcs signal from the RF amplifier chip, and accordingly export a tracking control signal to the tracking coil, wherein if the system is operated at a following mode, the central servo controller exports the tracking control signal to control the tracking coil according to the Te signal, and if the control system is operated at a seeking mode, the central servo controller exports the tracking control signal to control the tracking coil according to the Tcs signal.

2. A central servo control system, used to control an optical pickup head so as to read data stored on an optical disc, wherein the optical pickup head at least includes a lens, and is used to read an optical signal from the optical disc, the control system comprising:

a sled motor, used to hold the optical pickup head and move the optical pickup head to a desired position;

a tracking coil located on the optical pickup head, used to move the lens to a designed position so as to allow the data stored on the optical disc to be easily read; and a central servo controller, used to receive a tracking error (Te) signal and a central servo (Tcs) signal, and accordingly export a tracking control signal to the tracking coil, wherein if the system is operated at a following mode, the central servo controller exports the tracking control signal to control the tracking coil according to the Te signal, and if the control system is operated at a seeking mode, the central servo controller exports the tracking control signal to control the tracking coil according to the Tcs signal.

3. The control system of claim 2, wherein the control system further comprises a RF amplifier chip coupled to the optical pickup head so as to receive the optical signal, which is amplified and processed to produce a RF data signal, the tracking error (Te) signal, and the central servo (Tcs) signal.

4. A central servo control system, used to control an optical pickup head so as to read data stored on an optical disc, wherein the optical pickup head at least includes a lens, and is used to read an optical signal from the optical disc, the control system comprising:

a RF amplifier chip coupled to the optical pickup head, used to receive and process the optical signal from the optical pickup head, and export a RF data signal and a selected one of a tracking error (Te) signal or a central servo (Tcs) signal;

a sled motor, used to hold the optical pickup head and move the optical pickup head to a desired position;

a tracking coil located on the optical pickup head, used to move the lens to a designed position so as to allow the optical signal to be easily detected by the optical pickup head;

a central servo controller, which receives the RF data signal and the selected one of the Te signal or the Tcs signal, and accordingly exports a tracking control signal to the tracking coil, wherein if the system is operated at a following mode, the central servo controller receives the selected Te signal and exports the tracking control signal to control the tracking coil, and if the control system is operated at a seeking mode, the central servo controller receives the selected Tcs signal and exports the tracking control signal to control the tracking coil.

5. The control system of claim 4, wherein the RF amplifier chip further comprises a multiplexer, used to select the one of the Te signal or the Tcs signal.

6. The control system of claim 5, wherein the multiplexer receives a selection signal to select the one of the Te signal or the Tcs signal.

7. The control system of claim 6, wherein the selection signal is provided by the central servo controller.

8. The control system of claim 6, wherein the selection signal is provided by an external microprocessor.

9. A central servo control system, which is used to control an optical pickup head so as to read data stored on an optical disc, wherein the optical pickup head at least includes a lens, and is used to read an optical signal from the optical disc, the control system comprising:

a sled motor, used to hold the optical pickup head and move the optical pickup head to a desired position;

a tracking coil, located on the optical pickup head and used to move the lens to a designed position so as to allow the data stored on the optical disc to be easily read; and a central servo controller, which exports a sled motor control signal (FMO) and a tracking control signal (TRO) so as to respectively control the sled motor and the tracking coil, wherein if the control system is operated at a seeking mode, the TRO is compensated by an internal compensator of the central servo controller according to the FMO, and then is exported to control the tracking coil.

10. A central servo control system, which is used to control an optical pickup head so as to read data stored on an optical disc, wherein the optical pickup head at least includes a lens, and is used to read an optical signal from the optical disc, the control system comprising:

a sled motor, used to hold the optical pickup head and move the optical pickup head to a desired position;

a tracking coil, located on the optical pickup head and used to move the lens to a designed position so as to allow the data stored on the optical disc to be easily read;

a velocity estimator, coupled to the optical pickup head and used to estimate a moving velocity of the optical pickup head and accordingly export a velocity estimated signal Vspd to an central servo controller; and the central servo controller, which receives the Vspd and accordingly exports a sled motor control signal (FMO) and a tracking control signal (TRO) so as to respectively control the sled motor and the tracking coil, wherein if the control system is operated at a seeking mode, the TRO is generated according to the Vspd.

11. A central servo control system, which is used to control an optical pickup head so as to read data stored on an optical disc, wherein the optical pickup head at least includes a lens, and is used to read an optical signal from the optical disc, the control system comprising:

a radio frequency (RF) amplifier chip, coupled to the optical pickup head and used to receive and process the optical signal from the optical pickup head, and export a RF data signal, a tracking error (Te) signal, and a central servo (Tcs) signal;

a sled motor, used to hold the optical pickup head and move the optical pickup head to a desired position;

a tracking coil, which is located on the optical pickup head and is used to move the lens to a designed position so as to allow the optical signal to be easily detected by the optical pickup head;

a velocity estimator, which is coupled to the optical pickup head and is used to estimate a moving velocity of the optical pickup head and accordingly export a velocity estimated signal Vspd to a central servo controller; and the central servo controller, which receives the RF data signal, the Vspd, the Te signal, and the Tcs signal and exports a sled motor control signal (FMO) and a tracking control signal (TRO) so as to respectively control the sled motor and the tracking coil, wherein if the control system is operated at a seeking mode, the TRO before being exported is compensated by an internal compensator of the central servo controller according to the FMO and then the compensated TRO is combined with the Tcs signal and the Vspd so that the TRO, after combination, is exported by the central servo controller to control the tracking coil.

12. A central servo control system, which is used to control an optical pickup head so as to read data stored on an optical disc, wherein the optical pickup head at least includes a lens, and is used to read an optical signal from the optical disc, the control system comprising:

a radio frequency (RF) amplifier chip, coupled to the optical pickup head and used to receive and process the optical signal from the optical pickup head, and export a RF data signal and selectively export one of a tracking error (Te) signal or a central servo (Tcs) signal;

a sled motor, used to hold the optical pickup head and move the optical pickup head to a desired position;

a tracking coil, which is located on the optical pickup head and is used to move the lens to a designed position so as to allow the optical signal to be easily detected by the optical pickup head;

a velocity estimator, which is coupled to the optical pickup head and is used to estimate a moving velocity of the optical pickup head and accordingly export a velocity estimated signal Vspd to a central servo controller; and the central servo controller, which receives the RF data signal, the Vspd, and the selected one of the Te signal or the Tcs signal, and exports a sled motor control signal (FMO) and a tracking control signal (TRO) so as to respectively control the sled motor and the tracking coil, wherein if the control system is operated at a seeking mode, the TRO before being exported is compensated by an internal compensator of the central servo controller according to the FMO and then the compensated TRO is combined with the Tcs signal and the Vspd so that the TRO, after combination, is exported by the central servo controller to control the tracking coil.

13. An optical access apparatus to read data stored on an optical disc, the apparatus comprising:

an optical pickup head, which at least comprises a lens and is used to read an optical signal from the optical disc; and a central servo control system used to control the optical pickup head, in which the control system further comprises:

a RF amplifier chip coupled to the optical pickup head, used to receive and process the optical signal from the optical pickup head, and export a RF data signal and a selected one of a tracking error (Te) signal or a central servo (Tcs) signal;

a sled motor, used to hold the optical pickup head and move the optical pickup head to a desired position;

a tracking coil located on the optical pickup head, used to move the lens to a designed position so as to allow the optical signal to be easily detected by the optical pickup head;

a central servo controller, which receives the RF data signal and the selected one of the Te signal or the Tcs signal, and accordingly exports a tracking control signal to the tracking coil, wherein if the system is operated at a following mode, the central servo controller receives the selected Te signal and exports the tracking control signal to control the tracking coil, and if the control system is operated at a seeking mode, the central servo controller receives the selected Tcs signal and exports the tracking control signal to control the tracking coil.

14. An optical access apparatus to read data stored on an optical disc, the apparatus comprising:

an optical pickup head, which at least comprises a lens and is used to read an optical signal from the optical disc; and a central servo control system used to control the optical pickup head, in which the control system further comprises:

a sled motor, used to hold the optical pickup head and move the optical pickup head to a desired position;

a tracking coil, located on the optical pickup head and used to move the lens to a designed position so as to allow the data stored on the optical disc to be easily read; and a central servo controller, which exports a sled motor control signal (FMO) and a tracking control signal (TRO) so as to respectively control the sled motor and the tracking coil, wherein if the control system is operated at a seeking mode, the TRO is compensated by an internal compensator of the central servo controller according to the FMO, and then is exported to control the tracking coil.

15. An optical access apparatus to read data stored on an optical disc, the apparatus comprising:

an optical pickup head, which at least comprises a lens and is used to read an optical signal from the optical disc; and a central servo control system used to control the optical pickup head, in which the control system further comprises:

a sled motor, used to hold the optical pickup head and move the optical pickup head to a desired position;

a tracking coil, located on the optical pickup head and used to move the lens to a designed position so as to allow the data stored on the optical disc to be easily read;

a velocity estimator, coupled to the optical pickup head and used to estimate a moving velocity of the optical pickup head and accordingly export a velocity estimated signal Vspd to an central servo controller; and the central servo controller, which receives the Vspd and accordingly exports a sled motor control signal (FMO) and a tracking control signal (TRO) so as to respectively control the sled motor and the tracking coil, wherein if the control system is operated at a seeking mode, the TRO is generated according to the Vspd.

16. An optical access apparatus to read data stored on an optical disc, the apparatus comprising:

an optical pickup head, which at least comprises a lens and is used to read an optical signal from the optical disc; and a central servo control system used to control the optical pickup head, in which the control system further comprises:

a radio frequency (RF) amplifier chip, coupled to the optical pickup head and used to receive and process the optical signal from the optical pickup head, and export a RF data signal and selectively export one of a tracking error (Te) signal or a central servo (Tcs) signal;

a sled motor, used to hold the optical pickup head and move the optical pickup head to a desired position;

a tracking coil, which is located on the optical pickup head and is used to move the lens to a designed position so as to allow the optical signal to be easily detected by the optical pickup head;

a velocity estimator, which is coupled to the optical pickup head and is used to estimate a moving velocity of the optical pickup head and accordingly export a velocity estimated signal Vspd to a central servo controller; and the central servo controller, which receives the RF data signal, the Vspd, and the selected one of the Te signal or the Tcs signal, and exports a sled motor control signal (FMO) and a tracking control signal (TRO) so as to respectively control the sled motor and the tracking coil, wherein if the control system is operated at a seeking mode, the TRO before being exported is compensated by an internal compensator of the central servo controller according to the FMO and then the compensated TRO is combined with the Tcs signal and the Vspd so that the TRO, after combination, is exported by the central servo controller to control the tracking coil.

* * * * *